Oct. 16, 1956  J. D. WATTS ET AL  2,766,999
CONDUIT CONNECTION WITH CONICALLY FORMED INTER-ENGAGING
SEATS ON SEAL AND CONNECTION MEMBERS
Filed Feb. 12, 1954  4 Sheets-Sheet 1

INVENTORS
John D. Watts
Erwin F. Hill

BY Cushman, Darby & Cushman
ATTORNEYS

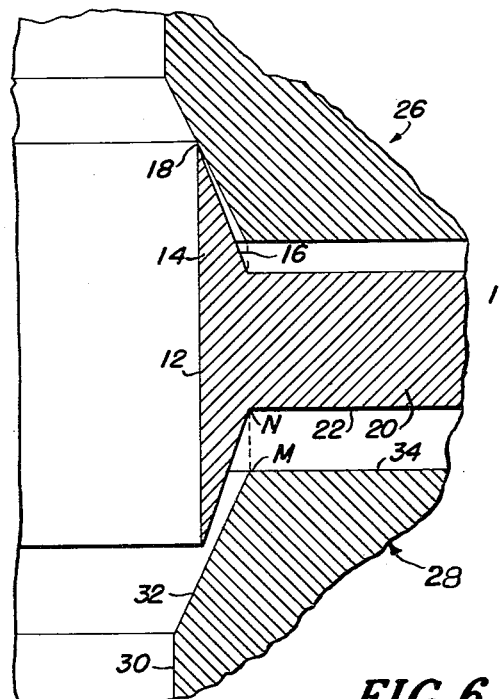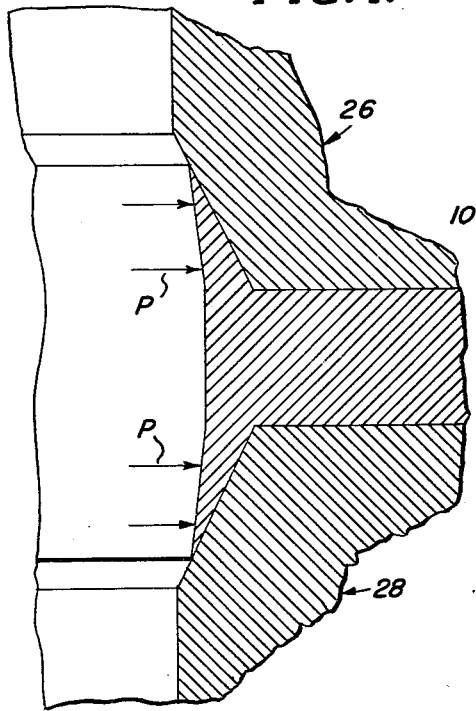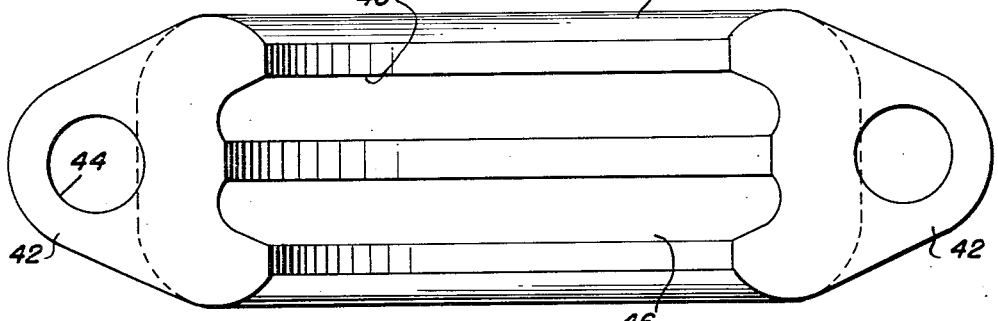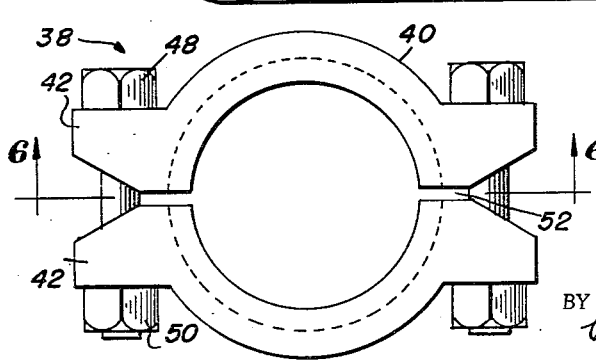

Oct. 16, 1956 J. D. WATTS ET AL 2,766,999
CONDUIT CONNECTION WITH CONICALLY FORMED INTER-ENGAGING
SEATS ON SEAL AND CONNECTION MEMBERS
Filed Feb. 12, 1954 4 Sheets-Sheet 3
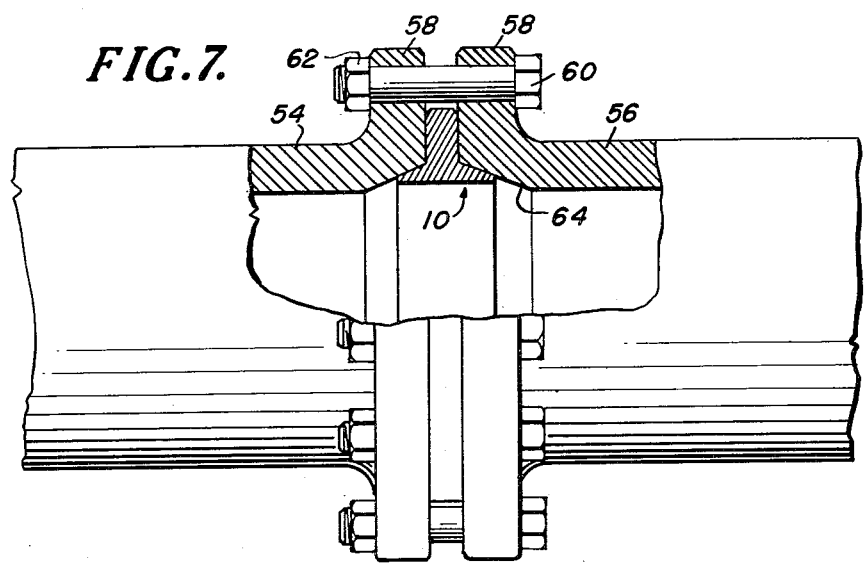
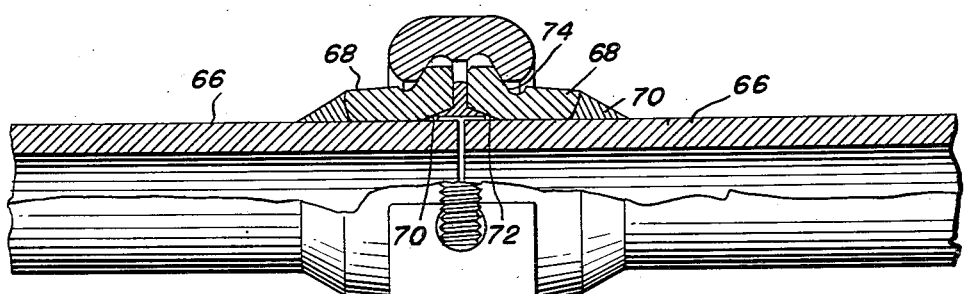
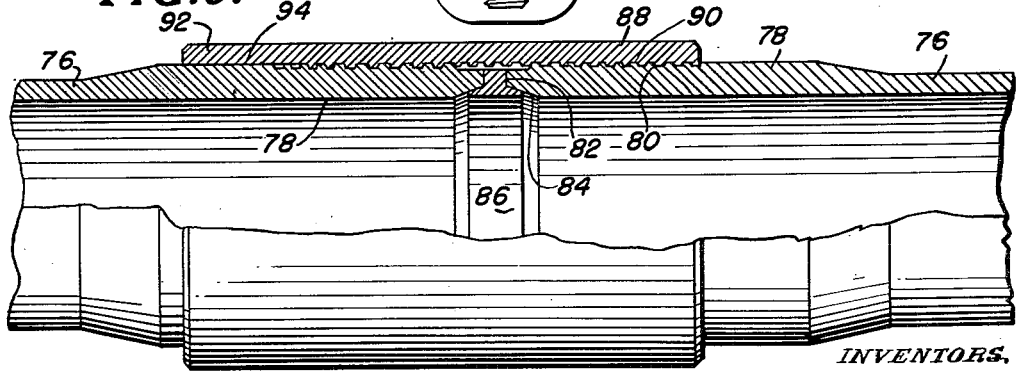
INVENTORS,
John D. Watts
Erwin F. Hill
BY Cushman, Darby & Cushman
ATTORNEYS

United States Patent Office 2,766,999
Patented Oct. 16, 1956

2,766,999

CONDUIT CONNECTION WITH CONICALLY FORMED INTERENGAGING SEATS ON SEAL AND CONNECTION MEMBERS

John D. Watts and Erwin F. Hill, Houston, Tex., assignors to Gray Tool Company, Houston, Tex., a corporation of Texas Application February 12, 1954, Serial No. 409,804

2 Claims. (Cl. 285—341)

This invention relates to coupling and sealing means, and more particularly to means for coupling and effecting seals between conduit parts to be joined for fluid communication. This application is a continuation-in-part of our pending application Serial No. 340,372, filed March 4, 1953, entitled "Well Head Equipment" and our pending application Serial No. 347,364, filed April 7, 1953, entitled "Conduit Connection With Conically Formed Interengaging Seats On Seal and Connection Members." The disclosure of said copending applications is incorporated into the present application by reference.

It is a principal object of the present invention to provide coupling and sealing means involving novel principles. Particularly, the invention contemplates provision of a sealing ring adapted to achieve and maintain an effective seal by means of stored energy, resulting from deflection of elements of the sealing ring within the elastic limit of the material of which it is made.

A further object of the invention is to provide sealing means of simple design, inexpensive to manufacture and exhibiting unusual strength, rigidity, versatility and permanence. The sealing means is small and compact, and makes possible coupled joints occupying a minimum of space, both radially and longitudinally.

Another object is to provide coupling and sealing means facilitating the making and breaking of pressure-tight joints conveniently and quickly. The invention contemplates a seal which may be effected by the imposition of only moderate force, the sealing element being completely protected by positive stop means, so as to preclude the application of excessive force thereagainst, which might damage or detrimentally affect the seal. The stop means is separate and distinct from the sealing element, and adapted by reason of its design and disposition to protect the sealing element. Additionally, the sealing means is adapted for repeated usage without damage or loss of efficiency.

Yet another object of the invention is to provide means capable of sealing relatively large diameter conduits against high pressures of the order of 25,000 or 30,000 pounds per square inch or more, and equally effective without modification or change for sealing against lower pressures. The seal achieved, moreover, is pressure assisted, whereby the efficiency of the device increases up to the bursting point of the conduit parts coupled.

Still another object is to provide sealing means of wide and varied utility, adapted to couple and seal pipes, tubes, casing, nipples, valves, well head equipment and other conduit parts to each other in any combination. Moreover, the sealing means is adapted for design and manufacture in a minimum number of standard sizes which, together with its versatility and usefulness for both high and low pressure applications, and the minimum number of parts involved, simplifies inventory problems.

A further object of the invention is to provide improved coupling and sealing means which preserve unimpaired full bore passage through conduit parts joined by said means.

It is also an object of the invention to provide coupling and sealing means which are automatically self-aligning, and adapted to precisely position and space conduit parts joined thereby. The invention is also adapted to couple in fluid-tight relationship conduit parts which may be plain ended, specially formed, threaded or flanged.

Further objects of the invention will be in part obvious and in part pointed out hereinafter.

The invention and the novel features thereof may best be made clear by reference to the following description and the accompanying drawings, in which:

Figure 3 is a sectional view, on enlarged scale, illustrating the relationship of a sealing ring of the invention to matched conduit parts prior to coupling and sealing;

Figure 4 is a view corresponding to Figure 3, but showing the elements in coupled and sealed relationship, and particularly illustrating in exaggerated manner the flexing or distortion of the sealing ring lips;

Figure 5 is a side view of an exemplary clamping assembly adapted to draw conduit parts together to effect a coupling and seal, and Figure 6 is a bottom plan view, on enlarged scape, of one of the clamping elements thereof, taken on the line 6—6 of Figure 5;

Figure 7 is an elevational view, partly in section, illustrating a sealed coupling between flanged conduit parts;

Figure 8 is an elevational view, partly in section, illustrating another variation of the completed coupling, between pipe ends to which are affixed distinct conduit parts adapted to effect a sealed joint according to the invention;

Figure 9 is an elevational view, partly in section, illustrating yet another completed coupling, between externally threaded conduit parts threadably engaged to an internally threaded sleeve associated with the sealing ring;

Figure 1:
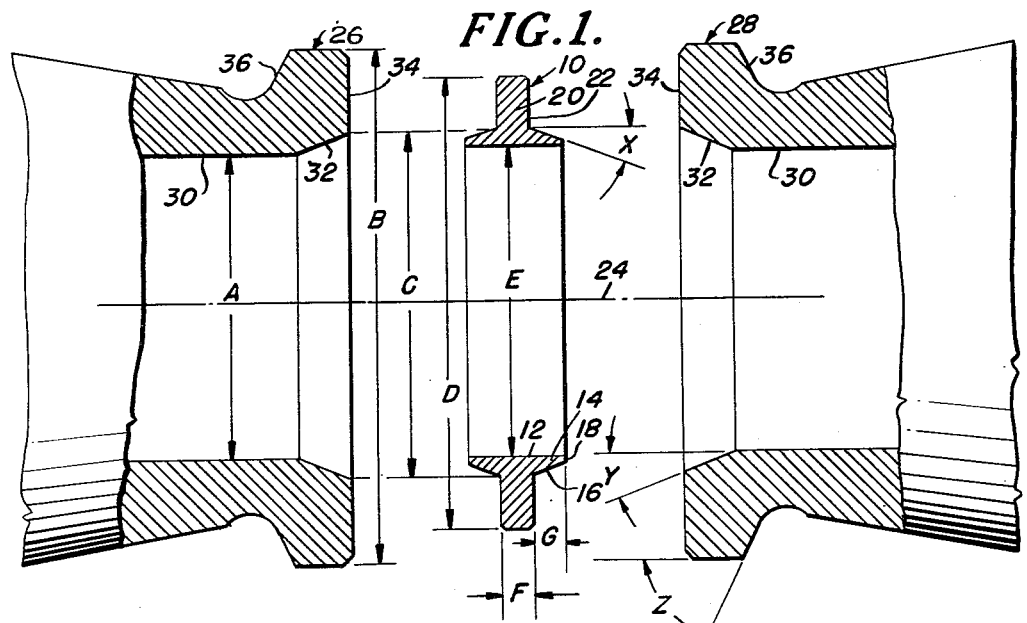
Figure 1 is a sectional view of a preferred embodiment of the invention, taken on the longitudinal axis, illustrating the principal elements thereof in separated position prior to coupling and sealing.

Referring to the drawings in detail, wherein like parts are indicated by identical numerals, a principal element of the invention is the sealing ring indicated generally as 10, see Figure 1. The sealing ring is constructed of elastic, flexible, hard and permanent material, preferably steel. The sealing ring 10 comprises an inner annular flange portion 12, from which oppositely disposed flexible sealing lips 14 extend in the generally axial direction. Each lips 14 is provided with an exterior sealing surface 16, generally conical in shape and tapering outwardly at an acute angle with respect to the bore of flange portion 12, and similarly with respect to the axis of the sealing ring. The lips 14, accordingly, are substantially triangular in cross section. The ends 18 of the sealing lips may be truncated as shown in Figure 1, in order to reduce the axial thickness of the ring and eliminate low strength edges. In some sizes and applications, the lips ends 18 may be pointed, as illustrated, for example, in Figure 3. The lip sealing surfaces 16 terminate in an integral substantially centrally disposed external rib portion 20, of relatively large thickness and length, the sides of which constitute bearing surfaces 22 disposed preferably in planes normal to the axis 24 of the sealing ring.

The sealing ring 10 is adapted to seal conduit parts such as 26 and 28 when coupled, the conduit parts being illustrated in Figure 1 in opposed but separated relationship. Each conduit part, it will be understood, may be a specially formed end of a pipe or tube, an outlet nipple from a valve or vessel, or any other conduit part. The fluid passages through the conduit parts, which in the example illustrated are similar, are defined by inner walls 30, which terminate in generally conical outwardly tapering sealing surfaces 32, adjacent the end surfaces 34 of the conduit parts.

Figure 2:
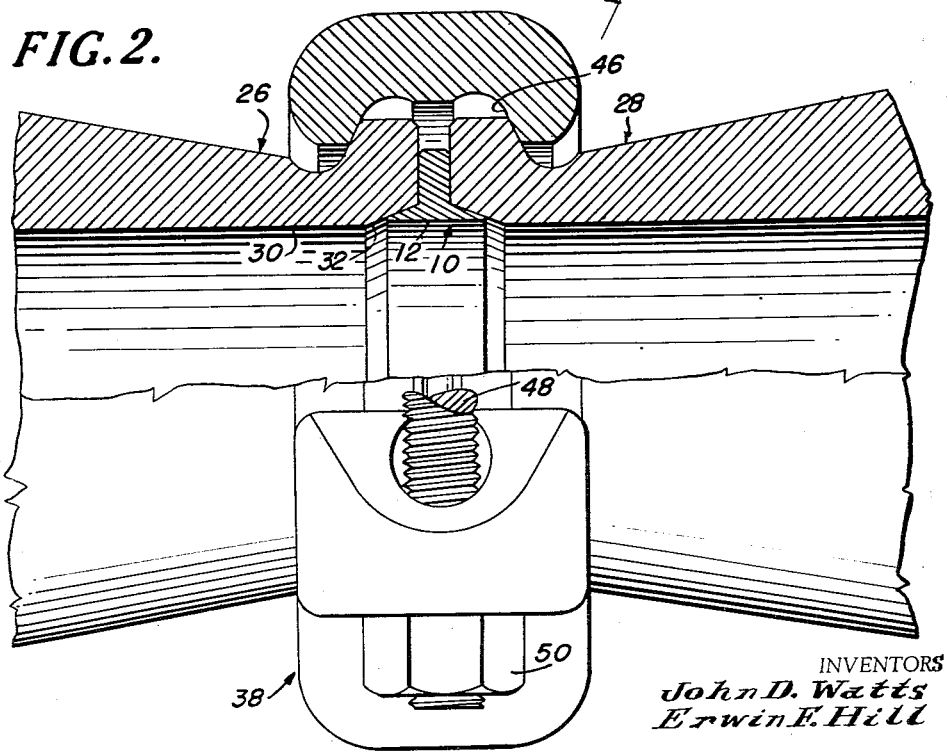
Figure 2 is a view corresponding to Figure 1, but showing the elements in contiguous relationship and drawn together by clamp means, whereby they are coupled and sealed.

The conduit parts may be joined and sealed by drawing them inwardly toward each other and into contact with the sealing ring, to the final position shown in Figure 2. Any conventional means may be employed to draw the conduit parts together. In the embodiment illustrated, the conduit parts 26 and 28 are provided with generally conical outer wedging surfaces 36 adjacent their ends, the wedging surfaces sloping outwardly and forwardly as shown. To cooperate with these wedging surfaces, a clamping assembly 38 is provided, the clamping assembly comprising, as best shown in Figures 2, 5 and 6, a plurality of arcuate segmental clamp elements 40, each provided at its ends with substantially radially extending lugs 42, apertured as at 44 for the reception of bolts. Each clamp element 40 is interiorly formed to provide opposed, properly spaced generally conical wedging surfaces 46, corresponding in taper or angularity to the wedging surfaces 36 of the conduit parts. By means of threaded bolts 48 and nuts 50, the clamp elements may be assembled about the conduit parts 26 and 28, including between them the sealing ring 10. Thereafter, the nuts 50 may be tightened to complete the coupling, in which case, as will be readily understood, the clamping assembly wedging surfaces 46 will act upon the complementary wedging surfaces 36 of the conduit parts to move them axially inwardly toward each other. That is, as the clamp elements of the clamping assembly are drawn together radially, the conduit parts will be forced together axially. For purposes presently apparent, the clamp elements 40 are designed so that when the clamp assembly is completed, the clamp elements will not meet, but will remain separated by spaces 52 between the ends thereof. In the illustrative embodiment, the clamping assembly comprises two substantially semicircular clamp elements 40, although it will be readily recognized that three or four or more may be employed.

The inward movement of the conduit parts into forcible engagement with the sealing ring is utilized to effect the novel sealing action of the present invention. As will best appear in Figure 3, the base of each sealing lip 14 is of relatively small thickness, so as to adapt the lip to flex or bend about its base, and it is the inward generally radial flexion of the sealing ring lips which is utilized to effect the seal.

As shown in exaggerated form in Figure 3, the angle of taper of the conduit part sealing surfaces 32 is slightly greater than the normal unflexed angle of taper of the sealing ring surfaces 16. Accordingly, when the conduit parts 26 and 28 are initially moved into contact with the sealing ring, the conduit part sealing surfaces will first engage the sealing ring lip ends 18. This may be effected by disposing the conduit parts in adjacency to and in substantial alignment with the sealing ring, and initially assembling the clamping assembly 38 about the joint. Finger tightening of the nuts 50 will normally assure initial contact between the sealing surfaces. As the nuts 50 are further tightened on the bolts 48, the clamp elements of the assembly will be drawn toward each other, and the conduit parts 26 and 28 will be correspondingly drawn together in the axial direction. As the conduit part bearing surfaces exert increased pressure upon the sealing ring lips, the lips will be progressively flexed or deflected radially inwardly, until the conduit part end surfaces 34 engage the bearing surfaces 22 of the sealing ring rib. At this point the seal will be completed, and it will be understood that only moderate force need be exerted on the nuts 50 to flex the sealing ring lips to the final position illustrated in Figure 4.

The size and thickness of the conduit parts 26 and 28 are such as to impart to them substantial rigidity, so that flexion of the coupling parts on make-up will be confined to the sealing ring lips. Expressed otherwise, the width or thickness of the conduit part end surfaces 34 is large as compared to the width or thickness of the sealing ring lips at the bases thereof.

The sealing ring rib 20, and in particular the bearing surfaces 22 thereof, serves as positive stop means, to limit the axially inward movement of the conduit parts relative to the sealing ring. That is, when the conduit parts have been drawn together sufficiently to fully flex the sealing ring lips in accordance with the design difference in angularity between the sealing ring lip sealing surfaces 16 and the conduit part sealing surfaces 32, the conduit part end surfaces 34 will meet and firmly contact the sealing ring rib bearing surfaces 22, and thereafter no further movement of the conduit parts is possible. This positive stop feature of the invention serves to isolate the sealing ring lips when flexed, and to positively protect them. Any additional force exerted by the conduit parts against the sealing ring, such as may be applied in make-up, will be exerted against the sealing ring rib portion as compressive stress, and will not further flex the sealing ring lips. This circumstance makes the coupling and sealing operation both simple and sure. For the workman making the coupling, it is necessary only that the clamping assembly nuts be tightened until the tightening action stops. The tightening action will stop in a manner readily perceptible, so that the operator will know that the coupling is completed. Since the sealing ring rib is of sufficient size and mass to resist crushing, it is not possible for the coupling and seal to be damaged or destroyed by excessive pressure.

It is the generally inward flexing action of the sealing ring lips which is principally relied upon to effect the desired seal, in view of which the angle of taper of the sealing surfaces 16 assumes critical importance. From general design considerations and extensive experimentation, it has been determined that the angle of taper of the lip sealing surfaces with respect to the sealing ring axis, indicated in Figure 1 by the letter X, may not exceed 45°, since angularity in excess of 45° would introduce the possibility of axial bearing failure before adequate radial flexing could be achieved. While angularity of 45° or slightly less theoretically might be employed, due to frictional considerations it has been found that axial bearing failure is a possibility, in the case of steel, when the angle X exceeds 35°. The maximum practical limit of angle X, then, is 35°. While any angle less than 35° is theoretically feasible, very small angles, again due to frictional considerations, are found to be self-locking, and result in seals difficult or impossible to break without damage to the sealing ring. The minimum practical limit of the angle X is found to be about 7.5°, and the preferred range of the angle X is from 7.5° to 25°.

The angle of taper of the conduit part sealing surfaces 32, indicated in Figure 1 by the letter Y, in order to effect the previously described flexion of the sealing ring lips must obviously exceed somewhat the angularity of the sealing surfaces of the lips of the sealing ring employed therewith. An essential feature of the invention resides in flexing or distorting the sealing ring lips within the elastic limit of the material, so that the seal will be maintained by energy stored within the lips by the minor distortion thereof and so that when the seal is broken the lips will return to normal initial positional relationship, whereby the sealing rings may be used again and again without damage or permanent distortion. To effect flexing of the sealing ring lips within the elastic limit of the material, the difference in angularity between the angles X and Y will normally depend upon the yield strength of the material from which the ring is constructed, the modulus of elasticity of the material, and the thickness of the sealing ring lips at the base thereof. As an example, in a ring constructed of steel having a yield strength of 90,000 pounds per square inch, a modulus elasticity of 30,000,000, and a lip base thickness of .175", the maximum difference in angularity would be approximately 1°.

For efficient sealing action, the inner diameter of the conduit part end surface 34, indicated by the letter M in Figure 3, must be substantially equal to the inner diameter of the sealing ring rib portion 20, that is to the diameter of the line of intersection between the cone in which the sealing ring lip sealing surface lies and the plane of the intersected bearing surface of the sealing ring rib portion, indicated by the letter N in Figure 3. These diameters are also indicated in Figure 1 by the dimension C.

Inward flexing of the sealing ring lips within the elastic limit of the material serves to store energy therein, as a result of which the lips exert a steady force outwardly against the adjoining sealing surfaces of the conduit parts. The steady pressure of the sealing ring lips is exerted uniformly about the circumference and maintains an effective seal, which seal is obviously assisted and enhanced by any internal pressure within the coupling. Internal pressure in the coupling will be exerted against the bore of the sealing ring, and such pressure, particularly that exerted against the inner surfaces of the sealing ring lips, will serve to force the sealing ring lips even more firmly into contact with the conduit part sealing surfaces. The internal fluid pressure forces are indicated in Figure 4 by the arrows P.

As will be apparent in Figure 4, the completed seal reduces the pressure subject area to substantially the inner diameter of the sealing ring. In most applications, the pressure subject area will preferably be reduced substantially to the inner diameter of the conduit parts. To insure a full bore passage through the coupling, it is necessary only that the inner diameter of the sealing ring when flexed be equal to or greater than the diameters defined by the inner walls of the conduit parts, which diameter is indicated by the letter A in Figure 1. This feature of the coupling and seal, permitting maintenance of full bore passage therethrough without increase of the pressure subject area, is an outstanding advantage of the invention, as will be readily understood.

The integral rib of the sealing ring is relatively heavy and of substantial mass, as compared with the lips of the sealing ring. When the sealing ring lips are flexed to form the pressure seal, there is no change in the overall diameter of the sealing ring. That is, the sealing ring rib and the sealing ring flange portion remain constant in diameter, and the sealing ring is not thereafter and cannot be expanded outwardly by pressure exerted on the sealing ring from within the conduit. The inward flexing of the lips, then, does not constitute an overall compression or reduction in diameter of the sealing ring, but is a purely local movement within the lips. The heavy body of the sealing ring, its rib, is gripped firmly between the end surfaces of the conduit parts, which bear against the sealing ring and insure maintenance of constant diameter. The mass of the sealing ring rib is sufficiently great to withstand any internal bursting pressure which may be exerted thereagainst, up to and beyond the bursting limit of the conduit parts and the conduits or vessels of which they are a part.

Due to the symmetrical design of the sealing ring and the corresponding design of the cooperative conduit parts, the sealing ring is self-aligning, and assembly of the coupling will automatically align the conduit parts with the sealing ring. Further, the sealing ring rib will serve to automatically space the conduit parts in predetermined relationship, since when the coupling is completed the end surfaces of the conduit parts will invariably be in firm contact with the bearing surfaces of the sealing ring rib.

The completed coupling is exceedingly rigid, since the end surfaces of the conduit parts are in firm contact with the sealing ring rib, and the sealing surfaces of the conduit parts are in equally firm contact with the sealing ring lips. Thereafter, no further flexing or movement in the coupling is possible, as a result of fluctuating pressures within the coupling, vibration, changes in temperature or the like. The coupling remains a rigid assembly, preloaded as it were, and no movement between the elements thereof can occur, so that wear, deformation and leakage are precluded.

In the embodiment illustrated in Figures 1 through 6, the angularity of the wedging surfaces 36 and 46 of the conduit parts and clamp assembly respectively, with respect to the longitudinal axis of the coupling, must obviously exceed 45° if substantial axially inward force is to be exerted on the conduit parts. This angularity is indicated in Figure 1 by the letter Z. The angularity of the wedging surfaces, it has been found, may range from about 55° to about 85°, substantially 65° being preferred. As previously indicated, the clamp elements 40 are so designed as not to contact each other when assembled, it being necessary to insure that the coupling is made by firm engagement of the conduit part end surfaces with the sealing ring rib. As will be readily understood, the distance which the conduit parts must be moved axially inwardly, from point of initial contact with the sealing ring lips to final coupling and sealed position, is relatively short, and assembly of the coupling is accordingly quite rapid. In the use of the clamping assembly, applying and tightening the assembly is simple and extremely rapid, and in the use of other means to draw the conduit parts together, the advantages of brief movement and correspondingly rapid make-up also obtain. It is also noteworthy that the coupling occupies but little space, in both axial and radial directions, and its compactness greatly enhances its usefulness for many applications.

In the embodiment first described, the conduit parts are specially formed to include wedging surfaces 36, which are utilized to draw the coupling parts together in assembly. The coupling parts may be formed in a variety of other ways. In Figure 7, for example, are illustrated modified conduit parts 54 and 56, provided with radially outwardly extending flanges 58 which are correspondingly apertured in the axial direction to accommodate bolts 60. By means of nuts 62 tightened on the bolts 60, the conduit part flanges may be drawn together, causing the sealing surfaces 64 provided in the flanged conduit parts to distort the sealing ring lips to the predetermined degree within the elastic limit of the material, and the end surfaces of the flanges 58 to thereupon seat on and forcibly contact the sealing ring rib, in the manner previously described, whereby the coupling and seal are effected.

Another embodiment of the inventive concept is illustrated in Figure 8, wherein two plain ended tubes 66 are coupled and sealed. In this embodiment a separate annular conduit part 68 is affixed to each tube adjacent the end thereof, as by a weld 70, the conduit parts 68 being provided interiorly with sealing surfaces 72 and exteriorly with wedging surfaces 74, whereby the conduit parts may be employed with a sealing ring of the type already disclosed and a clamping assembly 38 as illustrated in Figures 5 and 6 to effect a sealed coupling in the manner already described. The annular conduit parts 68 may be of substantially the same diameter as the tubes 66, and butt welded or otherwise engaged to the ends thereof. When the annular conduit parts are of such diameter as to enclose the ends of tubes 66, they are so positioned with respect to the tube ends that on make-up the tube ends will remain separated, as shown. In other words, it is essential that the coupling and seal be effected by forcible contact between the conduit parts 68 and the sealing ring, particularly the sealing ring rib, and contact between the opposed pipe ends must not be permitted to interfere.

Still another embodiment of the invention is illustrated in Figure 9, wherein the conduit parts to be coupled are piping or tubing sections 76. The tubing sections, in the illustrative embodiment, are upset at their ends to provide thickened end portions 78. The end portions 78 are exteriorly threaded, as at 80, and provided adjacent the end surfaces 82 thereof with tapered sealing surfaces 84, corresponding in all respects to the end surfaces 34 and sealing surfaces 32 of the conduit parts illustrated in Figure 1. The tubing sections are adapted to be coupled with a sealing ring 86, which may be identical with the sealing ring 10 described in connection with the previous embodiments. In this example, a collar 88, interiorly threaded as at 90, is provided to draw the tubing section end portions together, in making the sealed coupling. The collar may be engaged to the tubing sections by means of its threads only, or it may also be fixedly engaged at one end 92 thereof to the associated tubing section, for example as by a shrink lock at 94.

The manner of making up the coupling illustrated in Figure 9 will be apparent. With the sealing ring 86 between them, the tubing sections are threaded into the collar 88 until the sealing surfaces 84 engage the sealing ring lips, and shortly thereafter the end surfaces 82 forcibly engage the sealing ring rib. As in the previous embodiments, only moderate force is required to complete the coupling and seal, and the person making the coupling will know with certainty when it is properly completed, since it is necessary only to turn the tubing sections with respect to each other until a positive stop is encountered. The positive stop is not only readily perceptible, but also makes it impossible to make the union too tight. As in other embodiments, also, full bore passage through the coupling is maintained. It is noteworthy that the seal is effective not only against fluid pressure within the tubing sections, but is also effective against fluid pressure outside the tubing sections. This may be demonstrated, in this embodiment, by drilling through the collar substantially to the periphery of the sealing ring rib, thereby providing direct access of external fluid pressure to the seal. Testing in this manner with high pressures demonstrates that the seal is equally proof against leakage due to external pressure. This feature, of course, is similarly true of the other embodiments of the invention.

Figure 10:
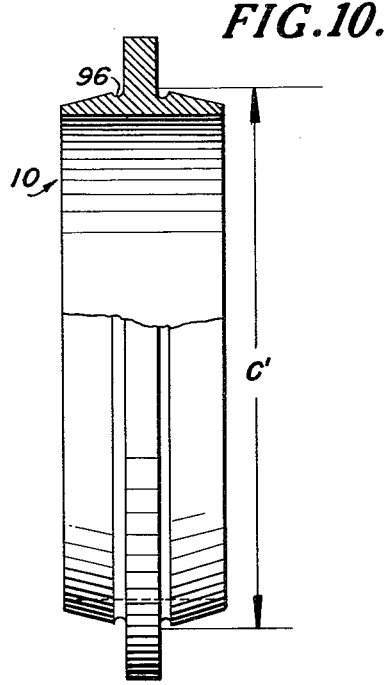
Figure 10 is an elevational view, partly in section, of a modified sealing ring according to the invention, provided with truncated and undercut sealing lips.
Figure 11:
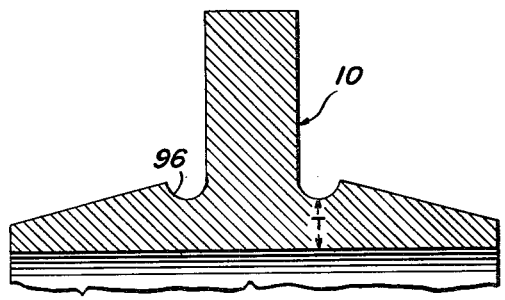
Figure 11 is an enlarged cross-sectional view of the sealing ring of Figure 10.

In some cases, particularly in larger sizes, the sealing ring lip ends 18 may desirably be truncated, to reduce the overall axial thickness of the rings. It may also be desirable in some cases, particularly in order to achieve desirable dimensional relationships, to undercut the sealing ring lips. Such a sealing ring is illustrated in Figures 10 and 11, the undercut being indicated at 96. The undercut is desirably on a smooth radius as shown, and when employed the effective thickness of the lip at its base will be measured from the undercut to the bore of the ring, as indicated by the dimension T in Figure 11. The smooth radius undercut does not detract from the ultimate strength or flexibility of the sealing lips.

Numerous factors enter into the design and dimensioning of suitable sealing rings and conduit parts for use therewith according to the invention. Many of these factors have already been indicated, and a table of exemplary dimensions for preferred coupling and sealing elements is set out below. These dimensions are clearly indicated in Figure 1, wherein A represents the bore of the coupling parts, B the outer diameter of the coupling parts, C the inner diameter of the coupling part end surfaces and also the inner diameter of the sealing ring rib portion bearing surfaces, or more particularly in the case of rings having undercut lips, the diameter of the line of intersection between the cone in which the sealing ring lip sealing surface lies and the plane of the intersected bearing surface of the sealing ring rib portion. The latter diameter is indicated by the dimension C' in Figure 10. Also in Figure 1, D represents the outer diameter of the sealing ring and E the sealing ring bore. F is the axial thickness of the sealing ring rib portion and G the axial length of the sealing ring lips. As indicated previously, X represents the angle of slope of the sealing ring bearing surfaces, Y the angle of slope of the conduit part sealing surfaces, and Z the angle of slope of the conduit part wedging surfaces and also the angle of slope of the clamping assembly wedging surfaces, all with respect to the coupling axis.

| A, In. | B, In. | C, In. | D, In. | E, In. | F, In. | G, In. | X, ° | Y, ° | Z, ° |
|--------|--------|--------|--------|--------|--------|--------|------|------|------|
| 2.4063 | 4.0 | 2.6875 | 3.50 | 2.4375 | .250 | .250 | 19 | 20 | 65 |
| 2.625 | 4.750 | 3.0 | 4.0 | 2.750 | .250 | .250 | 19 | 20 | 65 |
| 2.9063 | 4.8750 | 3.250 | 4.50 | 2.9375 | .250 | .8125 | 19 | 20 | 65 |
| 3.1875 | 5.50 | 3.5625 | 4.50 | 3.250 | .250 | .3125 | 19 | 20 | 65 |
| 7.0625 | 10.3750 | 7.750 | 9.0 | 7.250 | .250 | .6250 | 14 | 15 | 65 |
| 11.0 | 14.50 | 11.875 | 13.50 | 11.1875 | .500 | 1.0 | 14 | 15 | 65 |

From the table above a number of general conclusions may be drawn. First, for couplings of larger diameter, smaller angles of sealing surface taper within the preferred range will normally be more suitable. Also, for larger size couplings, the sealing ring lips will ordinarily be more severely truncated. It has also been found that sealing rings having undercut lips are more readily adapted to the larger coupling sizes.

Figure 12:
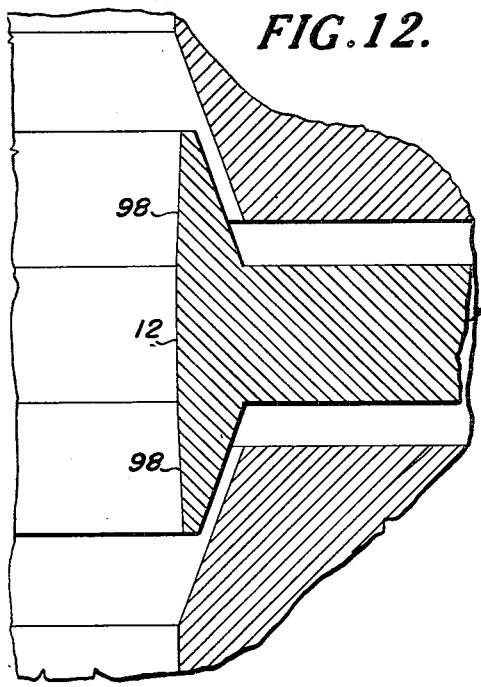
Figure 12 is a sectional view of another form of sealing ring according to the invention, the sealing lips of which are provided with sloping inner walls, in position for coupling to corresponding conduit parts.
Figure 13:
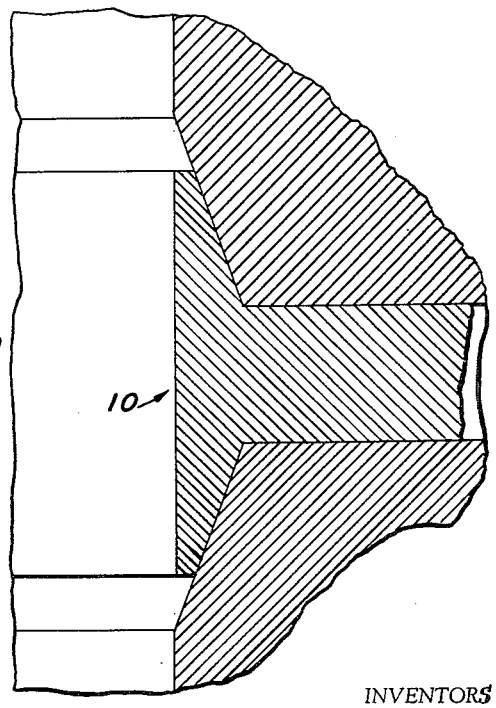
Figure 13 is a sectional view corresponding to Figure 12, showing the sealing ring and conduit parts in coupled and sealed relationship.

A modified type of sealing ring is illustrated in Figures 12 and 13, wherein the sealing ring and the adjacent conduit parts correspond to those of Figure 1 in all respects, except that the sealing ring lips are provided with inner surfaces 98 which taper outwardly from the flange portion 12 at a slight angle. As fully described in our copending application Serial No. 340,372, previously mentioned, the outwardly tapering inner surfaces 98 may be provided so that when the sealing ring lips are distorted inwardly in coupling, the sealing ring bore, including the lips, will be substantially cylindrical. This modification is important, as will be evident, where constant bore passage through the coupling is desired. Ordinarily, the angle of taper of the lip inner surfaces 98 with respect to the ring axis will equal or substantially equal the difference in angularity between the lip sealing surfaces and the associated conduit part sealing surfaces.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:
1. A unitary continuous sealing ring of hard metal or the like for the purpose described, comprising a inner annular flange portion with oppositely disposed flexible lips, and an integral substantially centrally disposed external rib portion, said lips having exterior sealing surfaces which taper outwardly toward said rib portion at an angle not exceeding 35° with respect to the longitudinal axis of the sealing ring, said tapered lips being undercut at the juncture points of said exterior sealing surfaces with said rib portion.

2. A high pressure coupling comprising first and second conduit parts having end surfaces presented toward one another and securing means for drawing said end surfaces toward one another, each of said conduit parts having aligned passages therein the walls of which terminate in outwardly flaring sealing surfaces adjacent said end surfaces of said parts, and a unitary sealing ring of hard metal or the like for sealing the ends of said parts when they are drawn toward one another, said sealing ring comprising an inner annular flange portion with oppositely disposed flexible lips and an integral substantially centrally disposed external rib portion, said lips having exterior sealing surfaces which taper outwardly toward said rib portion at an angle not exceeding 35° with respect to the longitudinal axis of the sealing ring and which are adapted to engage and seal with said flaring sealing surfaces on said conduit parts, said tapered lips being undercut at the juncture points of said exterior sealing surfaces with said rib portion, said rib portion being of substantial thickness as compared with said lip portions and having opposite faces which engage the end surfaces of said conduit parts and limit the degree of movement of said parts toward one another, the inner diameters of said conduit part end surfaces being substantially equal to the diameters of the lines of intersection between the cones in which said sealing ring lip sealing surfaces lie and the faces of said sealing ring rib portion.

References Cited in the file of this patent
UNITED STATES PATENTS

| | | |
|---|---|---|
| 1,132,086 | Goodall | Mar. 16, 1915 |
| 2,219,161 | Jacobs | Oct. 22, 1940 |
| 2,269,664 | Hallerberg | Jan. 13, 1942 |
| 2,340,732 | Bruno | Feb. 1, 1944 |
| 2,685,889 | Leighton | Aug. 10, 1954 |

FOREIGN PATENTS

| | | |
|---|---|---|
| 801,604 | Germany | Jan. 15, 1951 |